(12) United States Patent
DeLosh

(10) Patent No.: US 8,444,421 B1
(45) Date of Patent: May 21, 2013

(54) UNITY CIRCLE

(76) Inventor: Renée Michelle DeLosh, Richland, NY (US)

( * ) Notice: Subject to any disclaimer, the term of this patent is extended or adjusted under 35 U.S.C. 154(b) by 379 days.

(21) Appl. No.: 12/660,600

(22) Filed: Mar. 2, 2010

(51) Int. Cl.
G09B 19/00 (2006.01)

(52) U.S. Cl.
USPC ............................................ 434/236

(58) Field of Classification Search
USPC ............. 434/81, 82, 236, 247, 258, 260, 433; 446/107, 108; 119/770
See application file for complete search history.

(56) References Cited

U.S. PATENT DOCUMENTS

| 4,158,457 | A | * | 6/1979 | Hydro | 482/82 |
| 4,688,564 | A | * | 8/1987 | Kelly | 128/878 |
| 4,745,883 | A | * | 5/1988 | Baggetta | 119/770 |
| 4,765,279 | A | * | 8/1988 | Klickstein | 119/770 |
| 5,423,292 | A | * | 6/1995 | Hall | 119/770 |
| 5,638,772 | A | * | 6/1997 | Kaufmann et al. | 119/770 |
| 6,422,176 | B1 | * | 7/2002 | Tonuzi | 119/770 |
| 2006/0225669 | A1 | * | 10/2006 | Fontaine | 119/770 |

OTHER PUBLICATIONS

"Baloo's Bugle", Oct. 2005 [retrieved online Jul. 12, 2012].*
Wooden Boat Forum, "Dyneema Soft Shackles", Mar. 9, 2009 [retrieved online Dec. 10, 2012].*
Wing A ball™—BOODA.

* cited by examiner

*Primary Examiner* — Kurt Fernstrom

(57) ABSTRACT

A single piece or rope, twine, yarn, having at one end a loop, either secure or adjustable. The section in the middle of the unity circle can be any length. The other end of the rope has a knot. More than one of the same type sections is used to create the unity circle.

6 Claims, 2 Drawing Sheets

UNITY CIRCLE

FIELD OF THE INVENTION

This invention relates to a method and apparatus to help in the marriage or ceremonial joining ("blending") of two separate, previously existing families into one blended family.

BACKGROUND OF THE INVENTION

For purposes of this patent, a Blended Family, is defined as one of the following:

A. A family comprising of two adults who are entering into a religious, civil, or other union involving a ceremony. Other participants may include family members of one or both partners of previous or contemporary generations.

B. A family comprising two adults who are entering into a religious, civil, or other union involving a ceremony AND at least one child of the current or previous relationship(s) of one or both partners. Other participants may include family members of one or both partners of previous or contemporary generations.

C. One or more children who are entering under the legal or other are of that/those adults of A or B, above, through means such as adoption, a foster-care situation, or other socially approved manner.

Single moms and single dads are often getting married with one or more children included in the wedding ceremony. Many types of accessories have been used in the past to help with the symbolic attribute of the ceremony. They include water, sand, fire and candles, and some even include rope.

Water may achieve the same goal, but it dissipates after time, leaving no sentimental value for the future.

Sand may achieve the same goal, but is lightweight and the parts added by each person cannot be identified at a later date, if the ceremony is performed in a windy area, the process could be very difficult and not go as planned.

The unity candle cannot be used in outdoor ceremonies due to wind and it is not safe for small children to be involved in the use of fire.

The Gods knot has 3 cords joined by a brass ring. The groom holds the brass ring while the bride braids the 3 cords together symbolizing the union of God, husband and Wife.

The Lasso Ceremony, a rope is placed around the bride and groom's shoulders, necks or wrists, in the form of a "8" (the infinity symbol), to symbolize their everlasting union. It is usually placed there by an officiant, and remains there throughout the ceremony. It can be made of beads, white ribbon, orange flowers, fabric, silver crystal or painted wood. It can also include children.

The Celtic wedding tradition also includes a binding of the hands with a rope or ribbon. The officiant ties the hands of the bride and groom together with up to 3 ropes, it lasts only while they say their vows.

SUMMARY OF THE INVENTION

In accordance with one embodiment a unity circle section comprises a single piece of rope, twine, yarn, thread, ribbon, vinyl, nylon, rubber, leather, plastic, beads, metal chain or any combination of any. Having at one end a loop, either secure or adjustable. The length in the middle section can be any practical length, the other end having a knot of any type. More than one of the same type sections is used to create the unity circle.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

For purposes of brevity and clarity, like components and elements of the apparatus of this invention will bear the same designations or numbering throughout the FIGURES.

DETAILED DESCRIPTION OF THE PREFERRED EMBODIMENT

Figure 1A:
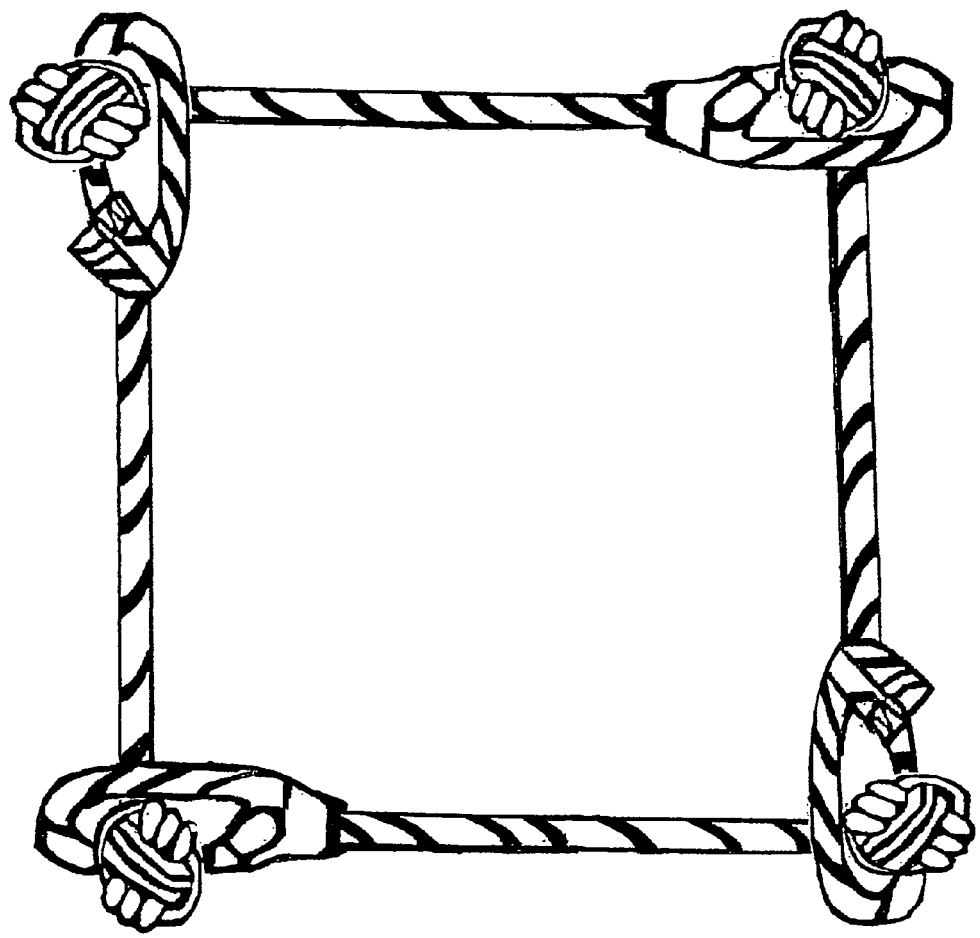
FIG. 1a depicts an elevation view of the entire unity circle after being connected, in accordance with the present invention.
Figure 1B:
FIG. 1b depicts a left side perspective view of one section.
Figure 1C:
FIG. 1c depicts a right side perspective view of one section.

One embodiment of the section of the unity circle 10 is illustrated in FIGS. 1a-1c.

In the preferred embodiment, the unity circle 10 comprises a piece of rope 12 approximately 31.2 cm long and approximately 1.95 cm in diameter. This piece of rope 12 is actually a 3-piece, twisted unit, and can be made of rope of any material, twine, yarn, thread, ribbon, vinyl, nylon, rubber, leather, plastic, metal chain, etc. Depending on the material, rope 12 may have as few as one component or any number of threads. The rope is handleless.

Figure 1D:
FIG. 1d depicts a left side perspective view of a single section with an adjustable slipknot loop instead of a stationary loop.

One end of the unity circle 10 contains a loop 14, approximately 3.9 cm in diameter. Loop 14 can be fixed or stationary as shown in FIG. 1a, or it can be adjustable as shown in FIG. 1d by means of a slipknot 16 in a continuous neck section 18.

At the other end 20 of the unity circle 10 a second knot 22 of any type is disposed approximately but not exactly ⅜ cm diameter, as shown in FIG. 1a. Unity circle 10 forms an actual closed loop such as an ellipse or a circle.

In operation, each member of the newly formed family, not shown, holds one section of unity circle 10. One person puts the second 22 knot into the loop 14 and repeats until the circle is completed.

The steps of putting the second knot into the loop of another person's section may be performed by each individual in a predetermined order. The predetermined order may be: alternate order, age order, gender order, height order, family relationship order or sequential order.

Figure 1E:
FIG. 1e depicts a left side perspective view of a single section with a locket charm, or any other trinket.
Figure 1F:
FIG. 1f depicts a left side perspective view of a single section with multi colored, 3-part twisted rope, twine, yarn, thread, of any material.
Figure 1G:
FIG. 1g depicts a left side perspective view of a single section with multi colored, 3-part twisted rope, twine, yarn, thread, of any material and a locket or any added trinket.

The second knot 22 fits into loop 14 snuggly unless a slip knot 16 (FIG. 1d) is used, whereby loop 14 is pulled tightly around second knot 22. A trinket or charm (FIG. 1e) made of any material containing or not containing a photo, is attached to each section of the unity circle in any location for decoration.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

For example, the invention can be applied to Team Sport and Business/Professional Team-Building.

What is claimed is:

1. A method of physically and psychologically joining at least two individuals comprising:
   a) providing a unity circle comprising a plurality of sections, where each segment comprises:
      i) a handleless length of material having a proximal end and a distal end;
      ii) a loop formed at the distal end of said length of material and secured by a first knot; and
      iii) a second knot formed at the proximal end of said length of material; wherein said second knot is sized to fit snugly inside said first loop;
   b) providing one section to each of a plurality of individuals,
   c) wherein an individual inserts said second knot of that individual's section into said first loop of another individual's separate section of material,
   d) repeating step (c) until a complete circle comprising a plurality of sections is formed, each individual performing step (c) once.

2. The method of physically and psychologically joining at least two individuals in accordance with claim 1, wherein said length of material is selected from the group: rope of any material, twine, yarn, thread, ribbon, vinyl, rubber leather, plastic, beads and metal chain.

3. The method of physically and psychologically joining at least two individuals in accordance with claim 1 wherein said second knot of each length of material comprises a fixed knot.

4. The method of physically and psychologically joining at least two individuals in accordance with claim 1, wherein at least one trinket is operatively connected to said unity circle, said trinket being selected from the group: charm and locket.

5. The method of physically and psychologically joining at least two individuals in accordance with claim 1, wherein said step (c) is performed by each individual in a predetermined order.

6. The method of physically and psychologically joining at least two individuals in accordance with claim 5, wherein said predetermined order is selected from the group: alternate order, age order, gender order, height order, family relationship order, and sequential order.

* * * * *